POLYPHASE CONTROL DEVICE

Filed Aug. 10, 1960 2 Sheets-Sheet 1

MARTIN MINTZ
JOHN DeVILLIER
STANLEY W. ZIMMERMAN
INVENTORS

BY George C. Sleeper[?] Agent

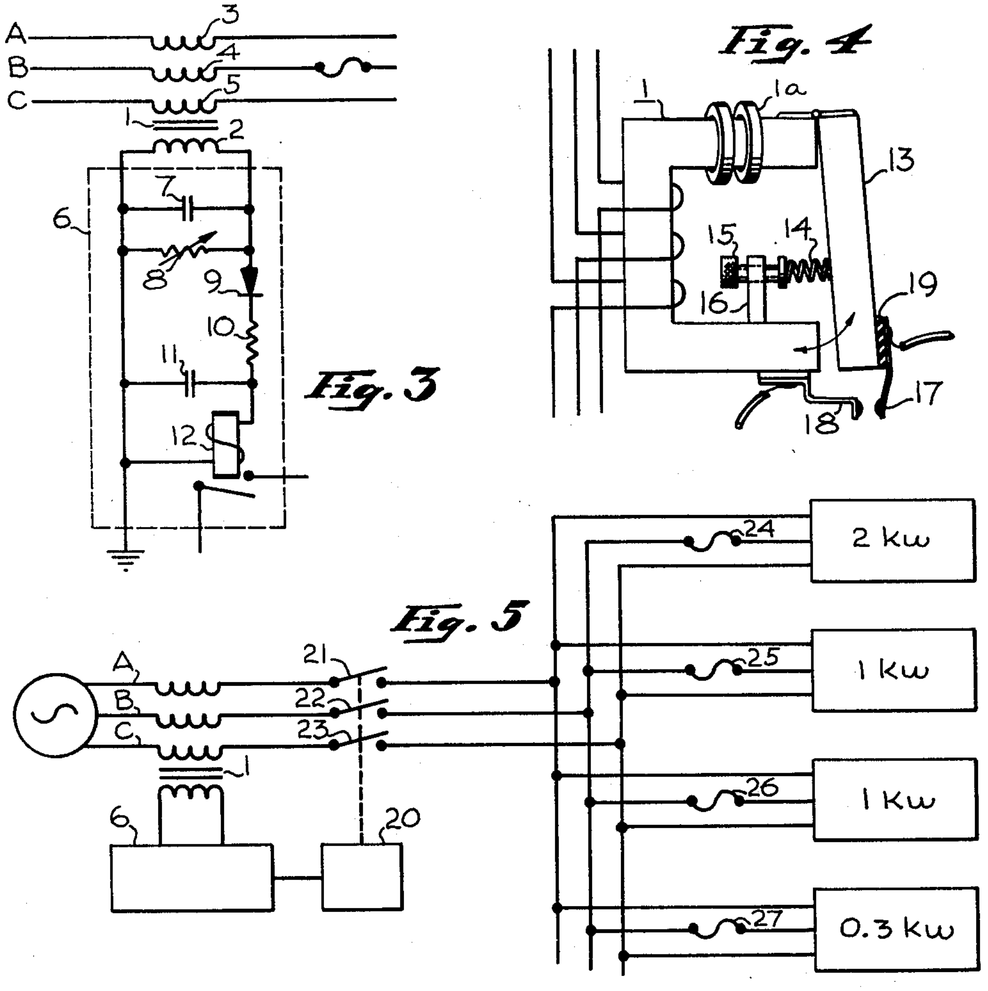
Fig. 3, Fig. 4, Fig. 5
Fig. 6
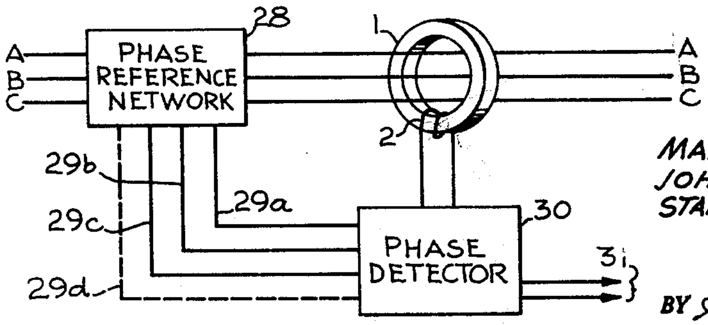
MARTIN MINTZ
JOHN DeVILLIER
STANLEY W. ZIMMERMAN
INVENTORS
BY George C. Thompson
agent United States Patent Office 3,165,671

Patented Jan. 12, 1965

3,165,671
POLYPHASE CONTROL DEVICE

Martin Mintz, Woodland Hills, and John De Villier, Northridge, Calif., and Stanley W. Zimmerman, Ithaca, N.Y., assignors to Thompson Ramo Wooldridge Inc., Canoga Park, Calif., a corporation of Ohio Filed Aug. 10, 1960, Ser. No. 48,762
13 Claims. (Cl. 317—27)

This invention relates to a polyphase control system and more particularly to a control system capable of responding to unbalanced conditions in a polyphase system regardless of whether the unbalanced condition is in response to overload or to open-circuit conditions.

Control systems utilized for polyphase circuits generally serve the purpose of both controlling and protecting the polyphase circuits against overload of the circuits due to a fault or other type of condition. These systems, however, do not provide a means for determining an open-circuit condition which may in some instances provide as much grief to the operator of a polyphase system as an overload condition. Such an example might be a condition where a fan or other cooling device is needed in order to maintain a sufficiently low temperature on an electronic converter operated from a polyphase power supply to enable it to operate without breakdown. Failure of the fan, which might be a relatively light load in either an open-circuit condition or a fault, could cause failure of the power supply itself.

The general method of providing protection of a polyphase system is the use of overload circuit breakers or fuses, in which the circuit breakers are adjusted to a normal overload level, for example, 50% of the normal full load condition. Under such circumstances, no protection is provided for an open-circuit condition, and, in addition, failure of a light load or an open phase of the polyphase system is ignored.

It is therefore an object of this invention to provide control for protection against single phasing, a failure of phase-to-ground, grounding of phase-to-phase loads, and undesirable changes in phase-to-ground loads in a system.

It is another object of this invention to provide a system capable of detecting small magnitude changes in one small component of a system while at the same time overlooking normal overloads of much greater magnitude.

It is another object of this invention to provide a protective system that is independent of load current variations within an established maximum load condition.

It is another object of this invention to provide a control system capable of responding to phase changes in polyphase circuits.

It is another object of this invention to provide a system that is responsive to open-circuit conditions for the purpose of providing an indication or control in response thereto.

Other objects, purposes, and characteristic features will become obvious as the description of the invention progresses.

In practicing this invention, there is provided in one embodiment thereof a single magnetic circuit coupled to a polyphase current supply line for the purpose of having a flux induced in the magnetic circuit in response to the currents carried by each of the polyphase conductors. The magnetic circuit is provided with means for detecting the resultant flux level created by the combined polyphase conductors, with the resultant flux providing control over an output signalling device or control circuit.

In the drawings:

FIG. 3 is a diagrammatic illustration of another embodiment of this invention capable of greater selectivity;

FIG. 4 is a view illustrating a simplified form of the polyphase control device of this invention;

FIG. 5 is a view illustrating a system control utilizing a detecting device such as shown in FIGS. 1, 3, and 4; and FIG. 6 is a view illustrating a control device sensitive to phase changes.

In each of the views, similar parts will bear like reference characters.

Figure 1:
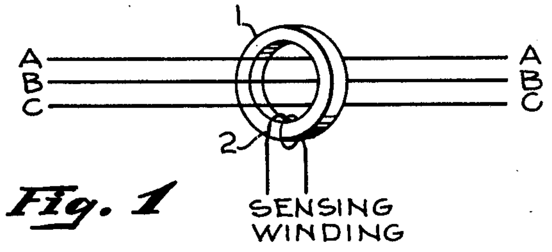
FIGURE 1 is a view illustrating one embodiment of the invention shown in simplified form.

The control device shown in FIG. 1 utilizes a magnetic circuit or core 1 which may be an air core or constructed of a suitable magnetic material which surrounds a plurality of polyphase conductors A through C in order that the conductors A through C may induce within the core 1 a flux, the vector sum of which is zero if the currents through the conductors are equal and separated by an equal number of electrical degrees. The system is shown for a three-phase system; however, any polyphase arrangement may be used as desired. The core 1 is provided with a detector coil 2 coupled to sense the resultant flux. The resultant flux is established by the current flow through all phases and the number of turns placed on the core in each of the phases. The normal balanced condition of flux is therefore a result of the ampere-turns, which may be varied to match load conditions normally expected. The ampere-turns, when adjusted to a balanced core flux condition providing little or no induced output voltage in the coil 2 by the fundamental, provides a reasonably strong harmonic output voltage in the coil 2, since the harmonics are instantaneously rising simultaneously in each of the phases. This harmonic can be filtered out or used, as desired. In some cases, the odd harmonics, such as the third, respond to turn-to-turn failure in relays or the like, since this type of failure increases the odd harmonics considerably while the fundamental is basically undisturbed. Where the load is not harmonic sensitive, the odd harmonics are filtered out, as shown in FIG. 3 and described hereinafter. A vector illustration of the fundamental frequency is presented in FIG. 2, where a balanced three-phase current vector diagram (*a*) is shown, in which the vector $\phi_A$ is shown at 0° and equal in magnitude to the vectors $\phi_B$ and $\phi_C$, which are shown at the 120° and 240° vector points, respectively. The resultant flux in the core 1 is shown in the vector diagram (*e*), and, since the vectors are equal in magnitude and equally displaced, the resultant flux is equal to zero.

Figure 2:
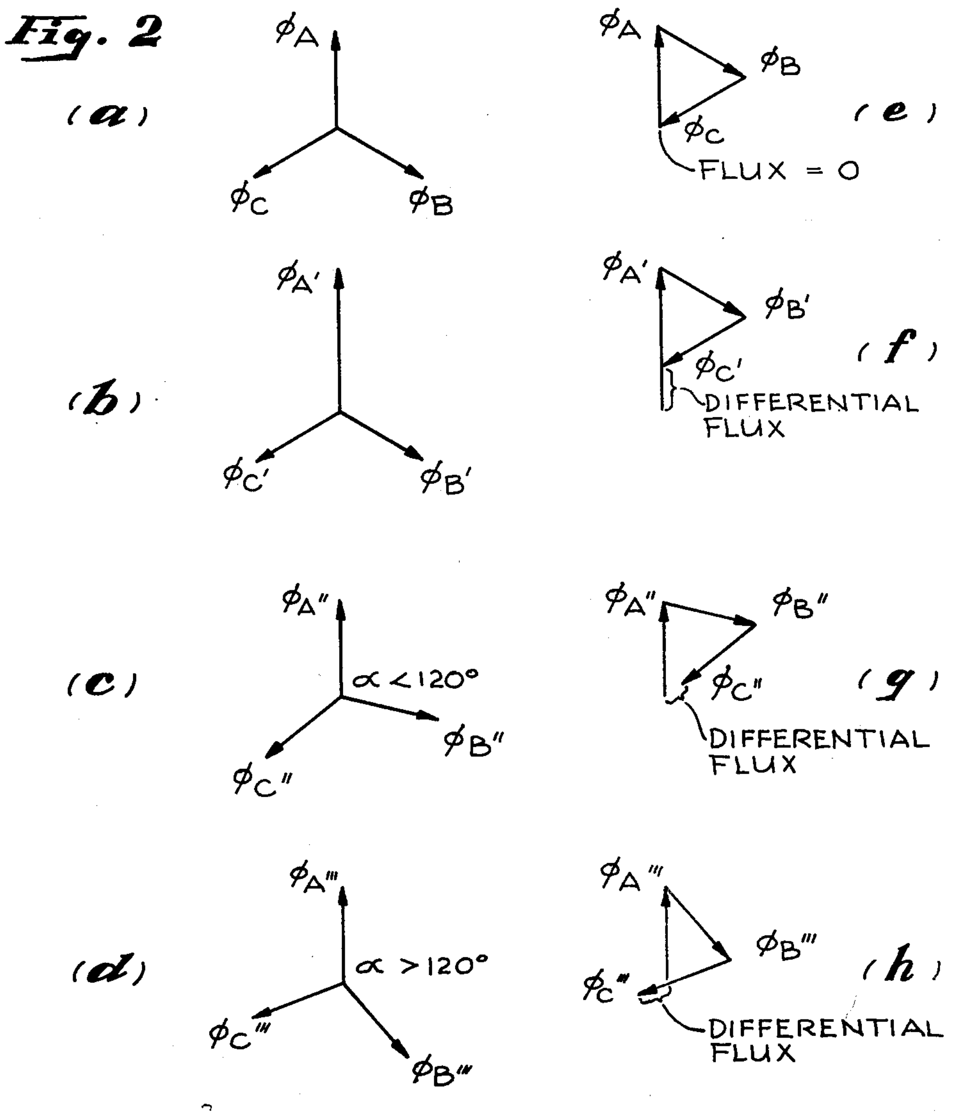
FIG. 2 shows vector diagrams (*a*) to (*d*) illustrating different current conditions and vector diagrams (*e*) to (*h*) illustrating different flux conditions that may exist in a device such as the one shown in FIG. 1.

If we assume that the conductors A, B, and C in FIG. 1 are supplying a normally balanced polyphase load, it can be seen that the resultant flux would be zero, as shown in the diagram (*e*) of FIG. 2. If we further assume, however, that a fault occurs in one of the conductors supplying the load, whether the fault be an open circuit or a severe load, it can be seen that a change will take place in the resultant flux within the core 1. If we take the case where the fault is one of a short circuit, for example, to ground, the vector diagram (*b*) of FIG. 2 showing an increase in one phase current over the other two remaining phase currents, as illustrated by the vector $\phi_{A'}$ over the vectors $\phi_B$ and $\phi_C$, it can be seen that the resultant flux within the core 1 is no longer zero and the vector diagram (*f*) illustrates the increase in flux that would occur during the summation of these three vectors.

If we assume that the fault or the condition desired to be detected is one involving a shift in the phase relationships among the three currents, the vector diagram (*c*) of FIG. 2 illustrates such a condition. Under these conditions, the magnitudes of the currents are all the same, but in this situation the angle $\alpha$ between the currents A and B causes a resultant flux within the core 1 of FIG. 1 which is illustrated by the diagram (*g*) as providing an output voltage in any coil coupled with the core 1, such as the detector coil or winding 2 shown therein. If the angle $\alpha$ between the current vectors had been greater than 120°, with the currents all of the same magnitude, the vector diagram (*d*) of FIG. 2 would be valid. In this case it is obvious that the resultant flux in diagram (*h*) would result in a voltage in the coil 2 for this condition also. It should be pointed out at this time that should one phase become open, the remaining two phases attempt to supply the load, which results in a large resultant flux in the core 1 and thus a large output voltage from the detector coil 2. The following table illustrates the action that can be expected from the control device applied to three-phase systems under different connections:

tion may be provided with other types of threshold such as a threshold source for the relay 12. As shown, the threshold in this particular case is adjusted by the number of turns on the detector coil 2 as well as by varying the value of the ballast resistor 8. As shown, a fuse is positioned in the conductor B between the winding 4 and the system under control. Failure of this fuse during overload conditions serves to induce the unbalanced polyphase current condition, similar to that upon a fault to ground, to produce operation of the relay 12.

In the embodiment shown in FIG. 4, the detector coil 2 shown in FIGS. 1 and 3 has been replaced by the armature 13 forming a part of the magnetic circuit or core 1. The sensitivity of the response needed by the armature 13 to any resultant flux occurring within the core 1 may be adjusted through the bias spring 14 and a suitable adjustment thumbscrew 15 received within a core-supported anchoring lug 16. By increasing or decreasing the spring compression, the threshold of response of the armature 13

TABLE I

*Protective Characteristics for Three-Phase Application*

| Supply | Load | Protection Afforded Under Following Condition | Other Characteristics |
|---|---|---|---|
| 3 phase Grounded Neutral | 3 phase Grounded Neutral | 1. Any fault current to ground<br>2. Excessive phase unbalance of 3 phase loads.<br>3. Phase omission due to open wire, fuse blowing, etc.<br>4. Exposure to large unidirectional surge in one or more supply lines.<br>5. "Ground Loop" currents. | a) Insensitive to additional single phase line-to-line loads.<br>b) Insensitive to line-to-line fault.<br>c) Somewhat sensitive to extreme wave form distortion. |
| 3 phase Grounded Neutral | 3 phase Ungrounded | 1. Any fault current to ground except when originating near system neutral. | a) Insensitive to additional single phase line-to-line loads.<br>b) Insensitive to line-to-line fault.<br>c) Insensitive to open phase wire.<br>d) "Ground Loops" do not exist unless a fault occurs. |
| 3 phase Ungrounded | 3 phase Grounded | 1. Sensitive to generator fault at location other than neutral. | a) Insensitive to load faults, unbalance, or open circuits. |
| 3 phase Ungrounded | 3 phase Ungrounded | 1. Sensitive only to double faults occurring in system area protected and other connected systems. | a) With exception at left, this application is not considered useful. |
| 1 phase wire Grounded | 3 phase Ungrounded | 1. Sensitive to certain faults to ground and phase unbalance. | a) This application not recommended. |
| 1 phase wire Grounded | 1 phase wire Grounded | 1. Very sensitive to phase unbalance | a) This application not recommended. |

In the illustration of FIG. 3, the core 1 is shown provided with polyphase windings 3, 4, and 5 associated with the conductors A, B, and C, respectively. Although these windings are shown with several turns, it is to be understood that the windings may comprise one or more turns as desired, and for purposes of specific application may comprise an unequal number of turns or may be tapped to provide easy adaptation. In this embodiment, the detector coil 2 is connected to an output network 6 consisting of a harmonic filter capacitor 7 connected thereacross and a variable ballast or shunt resistor 8 also connected thereacross. In addition, the output network 6 contains a rectifier 9 and a smoothing resistance capacitor filter consisting of a series resistor 10 and a detector coil shunt capacitor 11. The output from the resistor is connected to a suitable relay 12 (the details of which are not shown) capable of responding to small voltages of a type that would occur from a few turns in the detector coil 2. It is pointed out that the sensitivity of response can be adjusted by the number of turns placed in the detector coil 2. In addition, an amplifier of any suitable type (not shown) may be used to amplify the output voltage, as required. It can be seen, therefore, that the network 6 first filters out the harmonics through the use of capacitor 7, provides a substantially constant reflected impedance by the low resistance shunt resistor 8, and then rectifies the signal and smooths it for application to the D.-C. relay. Although this configuration is shown in detail, it should be understood that the network 6 may be modified to provide more or less sensitivity and in addimay be selected. In addition, suitable copper rings 1*a* of a resistance necessary to make the device a current responsive device may be placed about the core 1. The copper rings also introduce a time constant and reduce the effects of harmonics in the magnetic circuit 1. These rings have been shown in FIG. 4, however operation of the device is not necessarily limited to the use of such rings. The armature 13 is provided with a suitable electrical contact 17 which is movable into engagement with a fixed contact 18 mounted on the core 1. The contact 17 is insulated from the armature 13 by a suitable insulating block 19 and secured thereto by any suitable means (not shown).

In the embodiment of FIG. 5, a device such as the device of FIG. 3 is shown connected to a suitable well known type of circuit breaker 20 having contacts 21, 22, and 23 located in the three phase supply lines A, B, and C, respectively. An output voltage from the network 6 in this case would cause the circuit breaker 20 to interrupt the power supply to the entire load being protected by this control device. With the arrangement shown in FIG. 5, it is possible for the slightest change in the smallest load to be detected, while a large change in the entire load current is of very little consequence, as will be described hereinafter. If we assume that this system involves an electronic device rated 2 kw. with parallel-connected heating or lighting equipment consuming 1 kw., and a small fan drawing 0.3 kw., with the fan supplying cooling air for the 2 kw. electronic device, it can be seen that the fan load represents only a small percentage of the total power required by the system, and therefore it would be necessary to provide circuit breaker protection based on a slight overload in order to provide for fan protection and in turn electronic device protection. It is quite common, however, in systems of this nature for the 2 kw. electronic device to be overloaded by as much as 50%, or 1 kw., for reasonably long periods of time, and therefore circuit breaker control capable of protecting the system against fan failure is impossible. By using the polyphase protective device to control this system, however, it is possible to compensate for the normal unbalanced condition of the system and establish a threshold in the network 6 capable of ignoring any load unbalance in the three phases falling within the normal unbalanced limits. Since the increase of load current through all three phases cannot normally be detected by the device of this system because the magnetic circuit or core resultant flux would still remain within the threshold limits, any load or fault occurring that loads all three phases equally would be ignored. By the same token, overloads of the system within normal limits would also be ignored. In order to eliminate the possibility of failure of the system due to dangerously overloading all three of the phases, fuses or single phase circuit breakers, such as the fuses 24, 25, 26, and 27, are provided in one phase only of each of the loads in the system. In the case of the fuse 24, the fuse might well be overrated to allow the electronic device to reach a 50% overload without the fuse being interrupted. In the case of the fan, however, the fuse 27 may well be adjusted to rupture on a small overload, such as 10%, with the remaining fuses 25 and 26 established to a desired normal overload percentage level. If we now look at the system and presume that a fault occurs in the fan, causing a current increase in all three phases which is small to the system but over the 10% allowed by the fuse 27, it can be seen that the fuse 27 will rupture and result in an unbalance of the three phases substantially equal to the fan load that was previously being drawn over the three phases. In this instance, the core 1 has an increase in flux due to the unbalance, the network 6 with its relay 12 responds, and the circuit breaker 20 interrupts the entire system until correction can be made. In this instance it is shown that the failure due to an overload actually resulted in an open phase, thus illustrating the open phase detection characteristics of this control system. A phase-to-ground fault would also cause the unbalance and the increase in flux within the core 1, also resulting in detection by the network 6 and interruption by the circuit breaker 20 whether or not a fuse was ruptured. This system, as illustrated, therefore provides protection against an open circuit and faults (phase-to-ground and phase-to-phase), with the sensitivity being selected in the construction of the device or by an operator thereof.

The device set forth in FIG. 6 is one involving a control system in which the magnitude of the currents within the phases A, B, and C is ignored, and the phase of the currents therein is used to provide the output signal. In this case a suitable phase reference network, such as the network 28, is provided. Such a network may take any suitable form, such as two or three potential transformers connected between phases, in the case of a three-phase system. With this reference now provided, and assuming a substantially constant potential, the detector, such as shown in FIG. 1, may also be coupled to the conductors A, B, and C with its output detector coil 2 supplying voltage in response to the resultant flux within the coil 2 of the detector. The resultant voltage from the detector coil 2 and the reference voltages supplied by the transformer output conductors 29*a*, 29*b*, 29*c*, and the ground conductor 29*d* (if desired) of the phase reference network 28 are connected to a phase detector 30 of any suitable type capable of comparing the voltages from the phase reference network against the detector coil voltage for providing an output on the output circuit 31. The phase detector 30 may take any form, such as a network and relay, a phase angle relay or a phase shift device such as a synchro or a two slider ring potentiometer, or combinations or modifications of these or similar devices. Upon fault, the magnitude and phase of the flux change in the core 1 and thus the vector voltage of the coil 2 will change by a substantial amount, while the voltages of the reference network will change only a very small amount. The phase comparison of the two by the detector 30 results in a change in the output circuit 31.

The output signal from the output circuit 31 may be used to provide an indication on a phase meter or may be used to provide a desired control upon the phase displacement of the load currents drawn by the load. In addition, the output signal can be used to control a circuit breaker, such as the circuit breaker 20 shown in FIG. 5.

While there has been described what is at present considered a preferred embodiment of the invention, it will be obvious to those skilled in the art that various changes and modifications may be made therein without departing from the invention, and it is aimed in the appended claims to cover all such changes and modifications as fall within the true spirit and scope of the invention.

What is claimed is:

1. In a polyphase control system, an apparatus comprising: a single magnetic circuit; a plurality of separate conductors coupled to said magnetic circuit and connected to different phases of a polyphase alternating current of a specified fundamental frequency, the phases of which are relatively electrically displaced; the alternating current in said plurality of separate conductors establishing a resultant flux within said magnetic circuit of one phase angle and magnitude during one set of polyphase current conditions and a different phase angle and magnitude resultant flux during unbalanced polyphase current conditions relative to said one set of polyphase current conditions; means responsive to an overload in one of said plurality of separate conductors for interrupting current flow therethrough, thereby inducing an unbalanced polyphase current condition; and detecting means for said magnetic circuit responsive to said resultant flux established during said relatively unbalanced polyphase current condition, said detecting means including a capacitive harmonic filter for providing protection against harmonic additions in said detecting means, and ballast means for providing a substantially constant load to said magnetic circuit, said ballast means being a variable resistor to provide a threshold level of response in said detecting means.

2. In a polyphase control system, an apparatus comprising: a single magnetic circuit; a plurality of separate conductors coupled to said magnetic circuit and connected to different phases of a polyphase alternating current of a specified fundamental frequency, the phases of which are relatively electrically displaced; the alternating current in said plurality of separate conductors establishing a resultant flux within said magnetic circuit of one phase angle and magnitude during one set of polyphase current conditions and a different phase angle and magnitude resultant flux during unbalanced polyphase current conditions relative to said one set of polyphase current conditions; fuse means responsive to an overload in one of said plurality of separate conductors for interrupting current flow therethrough, thereby inducing an unbalanced polyphase current condition; and detecting means for said magnetic circuit responsive to said resultant flux established during said relatively unbalanced polyphase current condition, said detecting means including a capacitive harmonic filter for providing protection against harmonic additions in said detecting means, and ballast means for providing a substantially constant load to said magnetic circuit.

3. In a polyphase control system, an apparatus comprising: a single magnetic core; a plurality of separate conductors coupled to said magnetic core and connected to different phases of a polyphase alternating current of a specified fundamental frequency, the phases of which are relatively electrically displaced; alternating current in said plurality of separate conductors establishing a resultant flux within said magnetic core of one phase angle and magnitude during one set of polyphase current conditions and a different phase angle and magnitude resultant flux during unbalanced polyphase current conditions relative to said one set of polyphase current conditions; fuse means responsive to an overload in one of said plurality of separate conductors for interrupting current flow therethrough thereby inducing an unbalanced polyphase current condition; and detecting means for said magnetic core responsive to said resultant flux established during said relatively unbalanced polyphase current conditions, said detecting means including harmonic suppression means for providing protection against harmonic additions in said detecting means and ballast means for providing a substantially constant load to said magnetic core and a magnetic pivoted armature forming a part of said single magnetic core.

4. In a polyphase control system, an apparatus comprising: a single magnetic circuit; a plurality of separate conductors coupled to said magnetic circuit and connected to different phases of a polyphase alternating current of a specified fundamental frequency, the phases of which are relatively electrically displaced; the alternating current in said plurality of separate conductors establishing a resultant flux within said magnetic circuit of one phase angle and magnitude during one set of polyphase current conditions and a different phase angle and magnitude resultant flux during unbalanced polyphase current conditions relative to said one set of polyphase current conditions; means responsive to an overload in one of said plurality of separate conductors for interrupting current flow therethrough, thereby inducing an unbalanced polyphase current condition; detecting means for said magnetic circuit responsive to said resultant flux established during said relatively unbalanced polyphase current condition, said detecting means including an output coil coupled to said magnetic circuit; ballast means for providing a substantially constant load to said magnetic circuit, said ballast means being a variable resistor to provide a threshold level of response in said detecting means, relay means connected to said harmonic filter for response to induced voltages therein; and harmonic suppression means for suppressing the response of said detecting means to electrical signal components whose frequency corresponds to harmonics of said fundamental frequency.

5. In a polyphase control system, an apparatus comprising: a single magnetic core; a plurality of separate conductors coupled to said magnetic core and connected to different phases of a polyphase alternating current of a specified fundamental frequency, the phases of which are relatively electrically displaced; the alternating current in said plurality of separate conductors establishing a resultant flux within said magnetic core of one phase angle and a magnitude during one set of polyphase current conditions and a different phase angle and magnitude resultant flux during unbalanced polyphase current conditions relative to said one set of polyphase current condition; fuse means responsive to an overload in one of said plurality of separate conductors for interrupting current flow therethrough thereby inducing an unbalanced polyphase current condition; detecting means for said magnetic core responsive to said resultant flux established during said relatively unbalanced polyphase current conditions, said detecting means including harmonic suppression means for providing protection against harmonic additions in said detecting means and ballast means for providing a substantially constant load to said magnetic core and a magnetic contact carrying pivoted armature forming a part of said single magnetic core; and threshold means for said movable armature to provide a desired level of response to the resultant flux within said magnetic core.

6. In a polyphase control system, an apparatus comprising: a single magnetic core; a plurality of separate conductors coupled to said magnetic core and connected to different phases of a polyphase alternating current of a specified fundamental frequency, the phases of which are relatively electrically displaced; the alternating current in said plurality of separate conductors establishing a resultant flux within said magnetic core of one phase angle and magnitude during one set of polyphase current conditions and a different phase angle and magnitude resultant flux during unbalanced polyphase current conditions relative to said one set of polyphase current conditions; fuse means responsive to an overload in one of said plurality of separate conductors for interrupting current flow therethrough thereby inducing an unbalanced polyphase current condition; and detecting means for said magnetic core responsive to said resultant flux established during said relatively unbalanced polyphase current conditions, said detecting means including harmonic suppression means for providing protection against harmonic additions in said detecting means and ballast means for providing a substantially constant load to said magnetic core and a magnetic contact carrying pivoted armature forming a part of said single magnetic core, and threshold means for said movable armature to provide a desired level of response to the resultant flux within said magnetic core, said threshold means including a variable bias member.

7. A polyphase protective system for a plurality of loads of interdependent nature, each of which is connected to a plurality of separate conductors connected to different phases of a polyphase alternating current source, comprising: a single magnetic circuit coupled to the plurality of separate conductors to establish a resultant flux therein; a detector means coupled to said single magnetic circuit for response to said resultant flux; overload control means connected in one of the phase conductors adjacent each load, said overload control means for each load being responsive to a selected normal overload condition for each of the loads; and circuit interrupter means for each of the plurality of separate conductors capable of interrupting the supply of current to all of said loads, said detector means being connected to said circuit interrupter means for controlling the circuit interrupter means in response to resultant flux established in said magnetic circuit.

8. A polyphase protective system for a plurality of loads of interdependent nature, each of which is connected to a plurality of separate conductors connected to different phases of a polyphase alternating current source, comprising: a single magnetic circuit coupled to the plurality of separate conductors to establish a resultant flux therein; a detector means coupled to said single magnetic circuit for response to said resultant flux; overload control means connected in one of the phase conductors adjacent each load, said overload control means for each load being responsive to a selected normal overload condition for each of the loads; circuit interrupter means for each of the plurality of separate conductors capable of interrupting the supply of current to all of said loads, said detector means being connected to said circuit interrupter means for controlling the circuit interrupter means in response to resultant flux established in said magnetic circuit; and threshold means for said detector means for controlling the response of said circuit interrupter means to a selected flux level.

9. A system for providing a fault protection, comprising: a plurality of separate conductors connected to a polyphase alternating current supply; a load connected to said plurality of separate conductors; a phase angle reference network connected to said plurality of separate conductors; a polyphase protective device including a single magnetic circuit coupled to said plurality of separate conductors; detecting circuit means for said polyphase protective device coupled to said single magnetic circuit; phase detector means connected to said phase angle reference network and to said polyphase protective device detecting means for comparing the instantaneous phase of the phase angle reference network with the phase of the current in the detecting circuit means of the polyphase protective device; and output means for providing an output signal in response to a relative phase angle displacement detected by said phase detector means, said detecting circuit means being relatively insensitive to harmonic additions to said system.

10. A fault protection device for use in a polyphase system having a plurality of separate conductors connected to different phases of a polyphase alternating current of a specified fundamental frequency, the phases of which are relatively electrically displaced, the combination with said system of said fault protection device comprising: a single magnetic circuit, said magnetic circuit being coupled to said plurality of separate conductors, the alternating current in said plurality of separate conductors establishing a resultant flux within said magnetic circuit of one phase angle and magnitude during one set of polyphase current conditions and a different phase angle and magnitude resultant flux during unbalanced polyphase current conditions relative to said one set of polyphase current conditions; means responsive to an overload in one of said plurality of separate conductors for interrupting current flow therethrough, thereby inducing an unbalanced polyphase current condition; detecting means for said magnetic circuit responsive to said resultant flux established during said relatively unbalanced polyphase current condition; said detecting means including ballast means for providing a substantially constant load to said magnetic circuit, said ballast means being a variable resistor to provide a threshold level of response in said detecting means, and means for limiting harmonic response of said detecting means to electrical signal components of a single frequency.

11. A fault protection device for use in a polyphase system having a plurality of separate conductors connected to different phases of a polyphase alternating current of a specified fundamental frequency, the phases of which are relatively electrically displaced, the combination with said system of said fault protection device comprising: a single magnetic circuit, said magnetic circuit being coupled to said plurality of separate conductors, the alternating current in said plurality of separate conductors establishing a resultant flux within said magnetic circuit of one phase angle and magnitude during one set of polyphase current conditions and a different phase angle and magnitude resultant flux during unbalanced polyphase current conditions relative to said one set of polyphase current conditions; means responsive to an overload in one of said plurality of separate conductors for interrupting current flow therethrough, thereby inducing an unbalanced polyphase current condition; detecting means for said magnetic circuit responsive to said resultant flux established during said relatively unbalanced polyphase current condition, said detecting means including an output coil coupled to said magnetic circuit; relay means connected to said output coil for response to induced voltages therein; ballast means for providing a substantially constant load to said magnetic circuit, said ballast means being a variable resistor to provide a threshold level of response in said detecting means; and means for limiting harmonic response of said detecting means to electrical signal components of a single frequency.

12. A polyphase protection device for use in a polyphase system having a plurality of separate conductors each connected to a load and to different phases of a polyphase alternating current of a specified fundamental frequency, the phases of which are relatively electrically displaced, the combination with said system of a fault protection device comprising: a single magnetic circuit, said magnetic circuit being coupled to said plurality of separate conductors; detecting circuit means providing a portion of said polyphase protection device and coupled to said single magnetic circuit; a phase angle reference network connected to said plurality of separate conductors; phase detector means connected to said phase angle reference network and to said detecting means for comparing the instantaneous phase of the phase angle reference network with the phase of the current in the detecting circuit means; and output means for providing an output signal in response to a relative phase angle displacement detected by said phase detector means, said detecting circuit means being relatively insensitive to harmonic additions in said system.

13. In a polyphase control system, an apparatus comprising: a single magnetic circuit; a plurality of separate conductors coupled to said magnetic circuit and connected to different phases of a polyphase alternating current of a specified fundamental frequency, the phases of which are relatively electrically displaced, the alternating current in said plurality of separate conductors establishing a resultant flux within said magnetic circuit of one phase angle and magnitude during one set of polyphase current conditions and a different phase angle and magnitude resultant flux during unbalanced polyphase current conditions relative to said one set of polyphase current conditions; fuse means responsive to an overload in one of said plurality of separate conductors for interrupting current flow therethrough, thereby inducing an unbalanced polyphase current condition; and detecting means for said magnetic circuit responsive to said resultant flux established during said unbalanced polyphase current condition, said detecting means including an output coil coupled to said magnetic circuit, a capacitive harmonic filter for providing protection against harmonic additions in said detecting means, a ballast means for providing a substantially constant load to said magnetic circuit, said ballast means being a variable resistor to provide a threshold level of response in said detecting means, rectifying means for rectifying the signal filtered by said capacitive harmonic filter, said signal having a threshold level controlled by said variable resistor, and relay means connected to receive said rectified signal for responding thereto.

References Cited in the file of this patent

UNITED STATES PATENTS

| | | |
|---|---|---|
| 1,315,780 | Larzelere | Sept. 9, 1919 |
| 1,539,658 | Fitzgerald | May 26, 1925 |
| 1,667,655 | Clothier et al. | Apr. 24, 1928 |
| 1,776,130 | Petch | Sept. 16, 1930 |
| 1,929,059 | Fitzgerald | Oct. 3, 1933 |
| 1,980,395 | Fitzgerald | Nov. 13, 1934 |
| 2,068,575 | Stark | Jan. 19, 1937 |
| 2,238,570 | Schweitzer | Apr. 15, 1941 |
| 2,384,375 | Hayward | Sept. 4, 1945 |
| 2,938,150 | Kniel | May 24, 1960 |
| 2,965,810 | Claybourne et al. | Dec. 20, 1960 |

OTHER REFERENCES

Electrical Review, March 23, 1945, pages 423 and 424, "Core-Balance Protection."